(12) United States Patent
Oliver et al.

(10) Patent No.: US 7,928,607 B2
(45) Date of Patent: Apr. 19, 2011

(54) AIRCRAFT POWER SYSTEM AND APPARATUS FOR SUPPLYING POWER TO AN AIRCRAFT ELECTRICAL SYSTEM

(75) Inventors: Fred Oliver, Marysville, WA (US); Allan Saldecki, Marysville, WA (US)

(73) Assignee: Lamar Technologies LLC, Marysville, WA (US)

( * ) Notice: Subject to any disclaimer, the term of this patent is extended or adjusted under 35 U.S.C. 154(b) by 517 days.

(21) Appl. No.: 11/693,486

(22) Filed: Mar. 29, 2007

(65) Prior Publication Data

US 2008/0238201 A1 Oct. 2, 2008

(51) Int. Cl.
*H01H 47/00* (2006.01)

(52) U.S. Cl. .............. 307/115; 307/113; 307/126; 307/139

(58) Field of Classification Search ............ 307/113, 307/115, 126, 139
See application file for complete search history.

(56) References Cited

U.S. PATENT DOCUMENTS

| | | | |
|---|---|---|---|
| 4,058,742 A | 11/1977 | O'Brien | 307/260 |
| 4,157,578 A | 6/1979 | Gyursanszky | 361/91 |
| 4,215,268 A | 7/1980 | Dinkel | 219/507 |
| 4,272,704 A | 6/1981 | Alexander | 315/205 |
| 4,338,649 A | 7/1982 | Mosier | 361/139 |
| 4,464,605 A | 8/1984 | Ford, Jr. et al. | 315/134 |
| 4,500,802 A * | 2/1985 | Janutka | 327/432 |
| 4,528,456 A | 7/1985 | Harris | 307/31 |
| 4,554,501 A | 11/1985 | Baker | 322/29 |
| 4,672,231 A | 6/1987 | Sutton et al. | 307/118 |
| 4,724,331 A | 2/1988 | Nordlund | 290/38 |
| 4,728,825 A * | 3/1988 | Sugayama et al. | 327/434 |
| 4,744,018 A | 5/1988 | Eccleston | 363/16 |
| 4,829,457 A | 5/1989 | Russo et al. | 364/550 |
| 5,027,002 A | 6/1991 | Thornton | 307/35 |
| 5,047,890 A | 9/1991 | Kessler | 361/93 |
| 5,204,610 A | 4/1993 | Pierson et al. | 320/15 |
| 5,281,905 A | 1/1994 | Dhyanchand et al. | 322/32 |
| 5,355,024 A | 10/1994 | Elliott et al. | 307/73 |
| 5,418,708 A | 5/1995 | Nairus | 363/65 |
| 5,479,162 A * | 12/1995 | Barger et al. | 340/945 |
| 5,583,384 A * | 12/1996 | Henry | 307/113 |
| 5,659,243 A | 8/1997 | Smith | 324/119 |
| 5,838,144 A | 11/1998 | Wills et al. | 323/238 |
| 5,889,775 A | 3/1999 | Sawicz et al. | 370/360 |
| 5,943,223 A | 8/1999 | Pond | 363/21 |
| 5,982,259 A | 11/1999 | Godfrey et al. | 335/177 |
| 5,991,166 A | 11/1999 | Kalfhaus | 363/16 |

(Continued)

*Primary Examiner*—Hal I Kaplan
(74) *Attorney, Agent, or Firm*—Priya Sinha Cloutier

(57) ABSTRACT

An aircraft power system is provided having an aircraft power supply and a bidirectional switch. The aircraft power supply includes an alternator, a battery and a load. The bidirectional switch is coupled between one of the alternator and the battery, and the load. The switch includes a first FET, a second FET and timing circuitry. A source of the first FET is coupled with a source of the second FET. A drain of the first FET is coupled with one of the alternator and the battery. A drain of the second FET is coupled with the load. The timing circuitry is configurable to generate a control signal deliverable to a gate of the first FET and the second FET for setting the first FET in selective on and off positions and the second FET in corresponding selective off and on position.

12 Claims, 13 Drawing Sheets

U.S. PATENT DOCUMENTS

| | | | |
|---|---|---|---|
| 6,038,152 A | 3/2000 | Baker | 363/89 |
| 6,069,804 A | 5/2000 | Ingman et al. | 363/21 |
| 6,091,596 A | 7/2000 | Godfrey et al. | 361/154 |
| 6,098,174 A | 8/2000 | Baron et al. | 713/300 |
| 6,181,190 B1 * | 1/2001 | Wiklund et al. | 327/434 |
| 6,233,650 B1 | 5/2001 | Johnson et al. | 711/5 |
| 6,262,565 B1 | 7/2001 | Williams et al. | 323/237 |
| 6,278,279 B1 | 8/2001 | Daun-Lindberg et al. | 324/427 |
| 6,404,173 B1 * | 6/2002 | Telefus | 323/272 |
| 6,459,175 B1 | 10/2002 | Potega | 307/149 |
| 6,606,257 B2 * | 8/2003 | Bourdillon | 363/21.12 |
| 6,744,151 B2 * | 6/2004 | Jackson et al. | 307/43 |
| 6,882,829 B2 | 4/2005 | Mostov et al. | 455/83 |
| 6,908,289 B2 | 6/2005 | Scanderbeg et al. | 417/32 |
| 6,977,513 B2 * | 12/2005 | Matsunaga | 324/713 |
| 7,106,121 B2 | 9/2006 | Hidaka et al. | 327/308 |
| 7,106,566 B2 | 9/2006 | Liu et al. | 361/90 |
| 7,112,944 B1 | 9/2006 | Kojori | 322/29 |
| 7,138,845 B2 | 11/2006 | Lin | 327/308 |
| 7,245,469 B2 * | 7/2007 | Nemoto et al. | 361/65 |
| 7,391,133 B1 * | 6/2008 | Hennessy et al. | 307/113 |
| 7,393,248 B2 * | 7/2008 | Best et al. | 439/638 |
| 7,403,200 B2 * | 7/2008 | Abdoulin | 345/211 |
| 7,671,490 B2 * | 3/2010 | Hartung et al. | 307/115 |

* cited by examiner

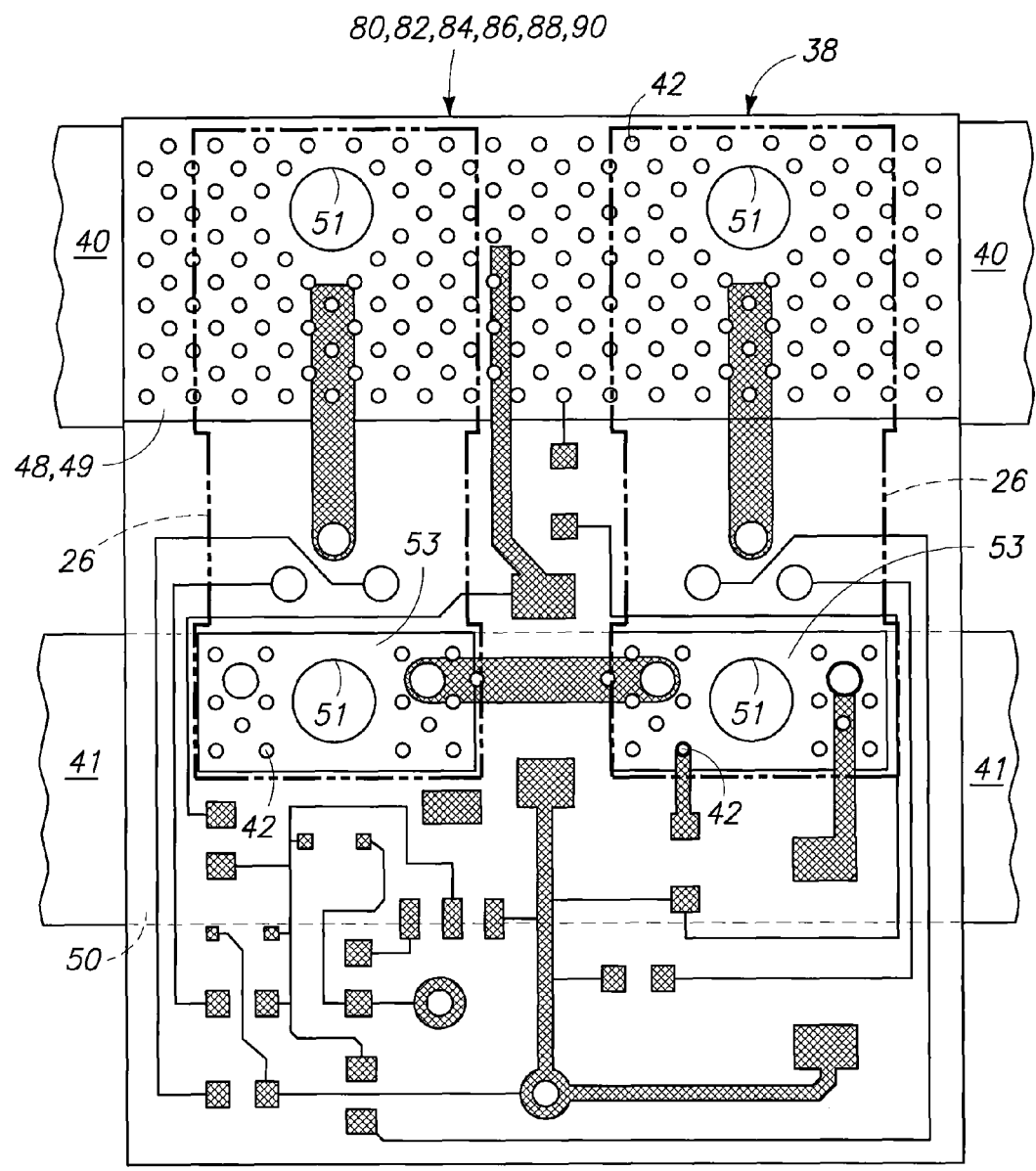

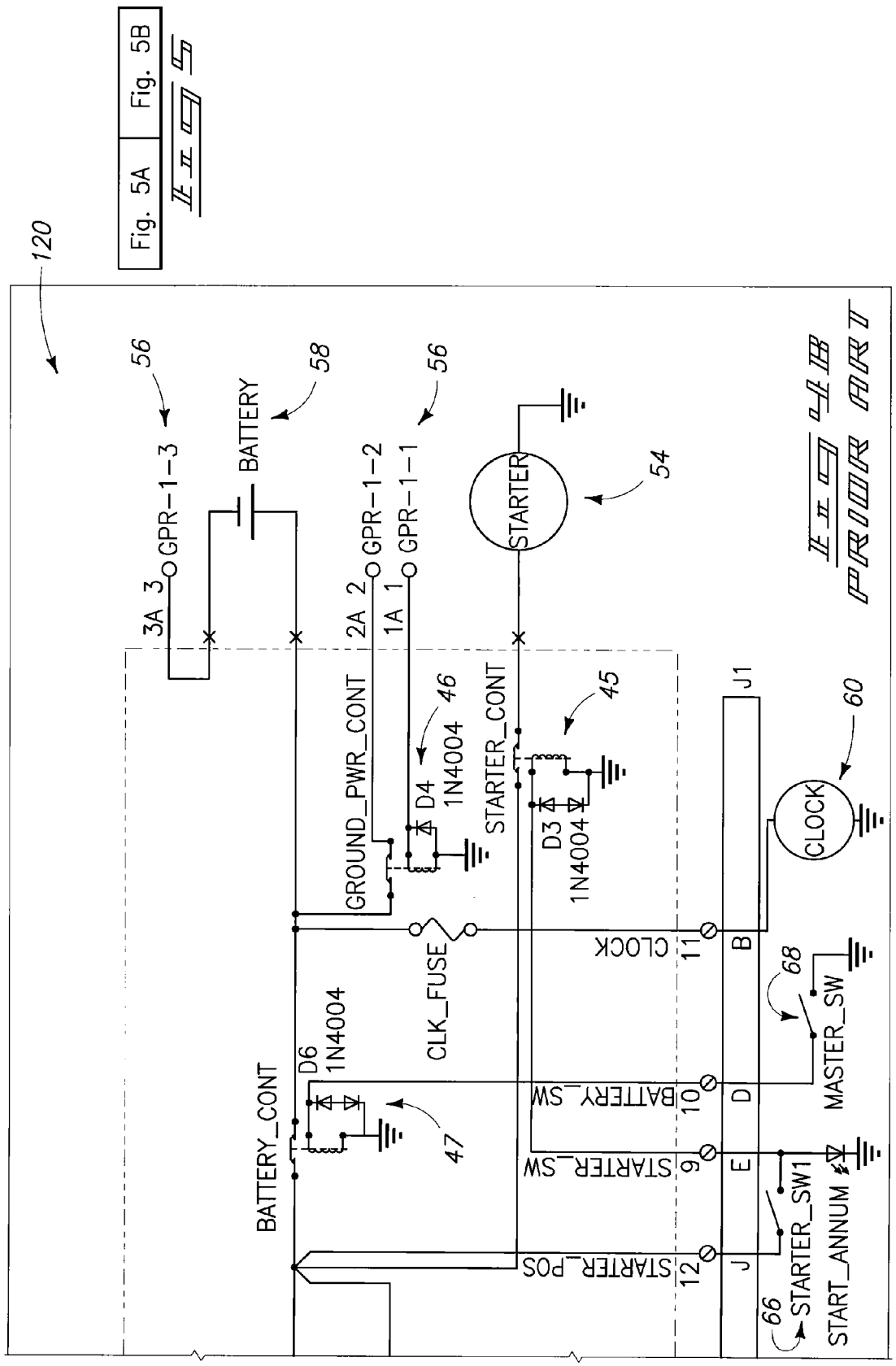

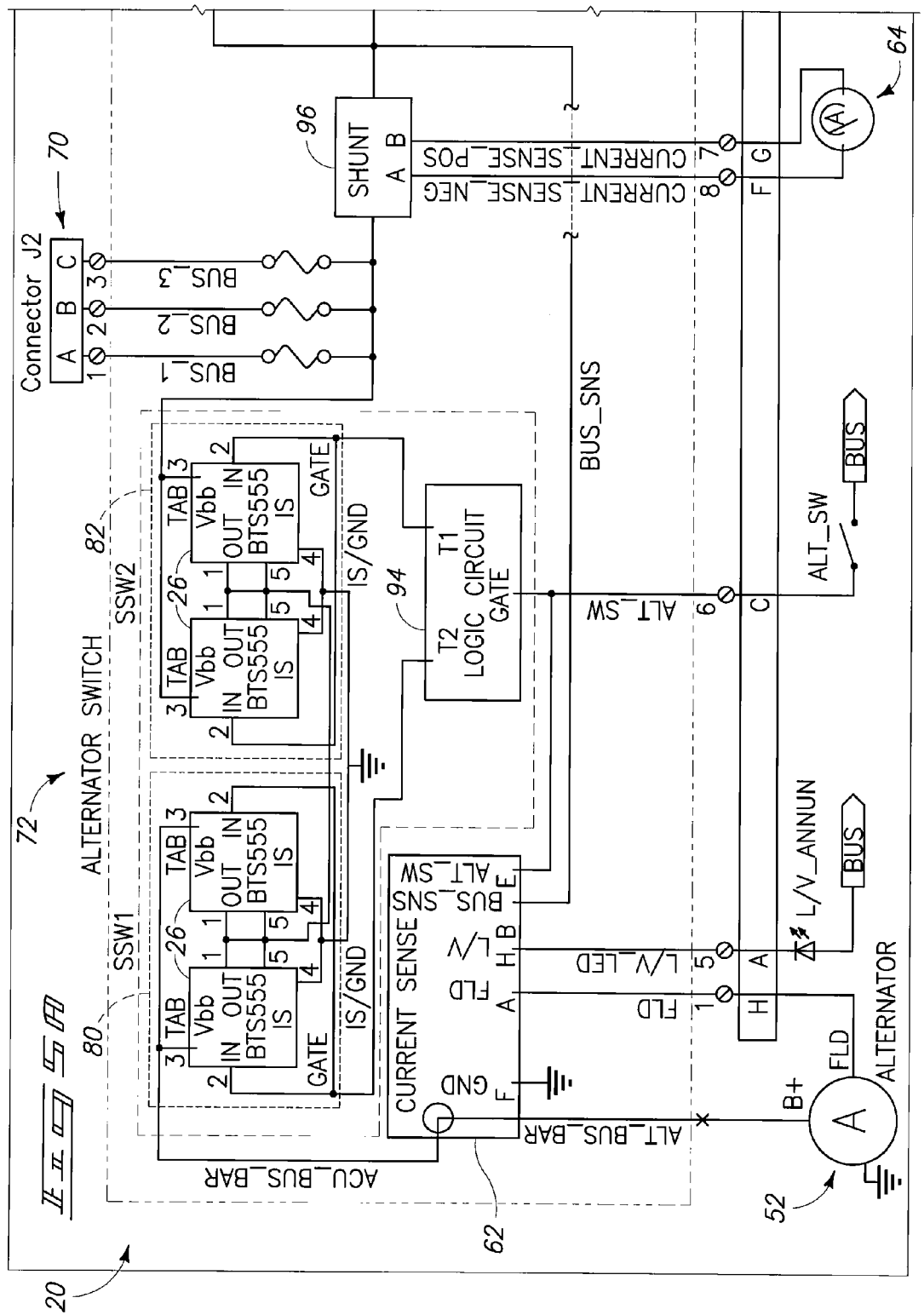

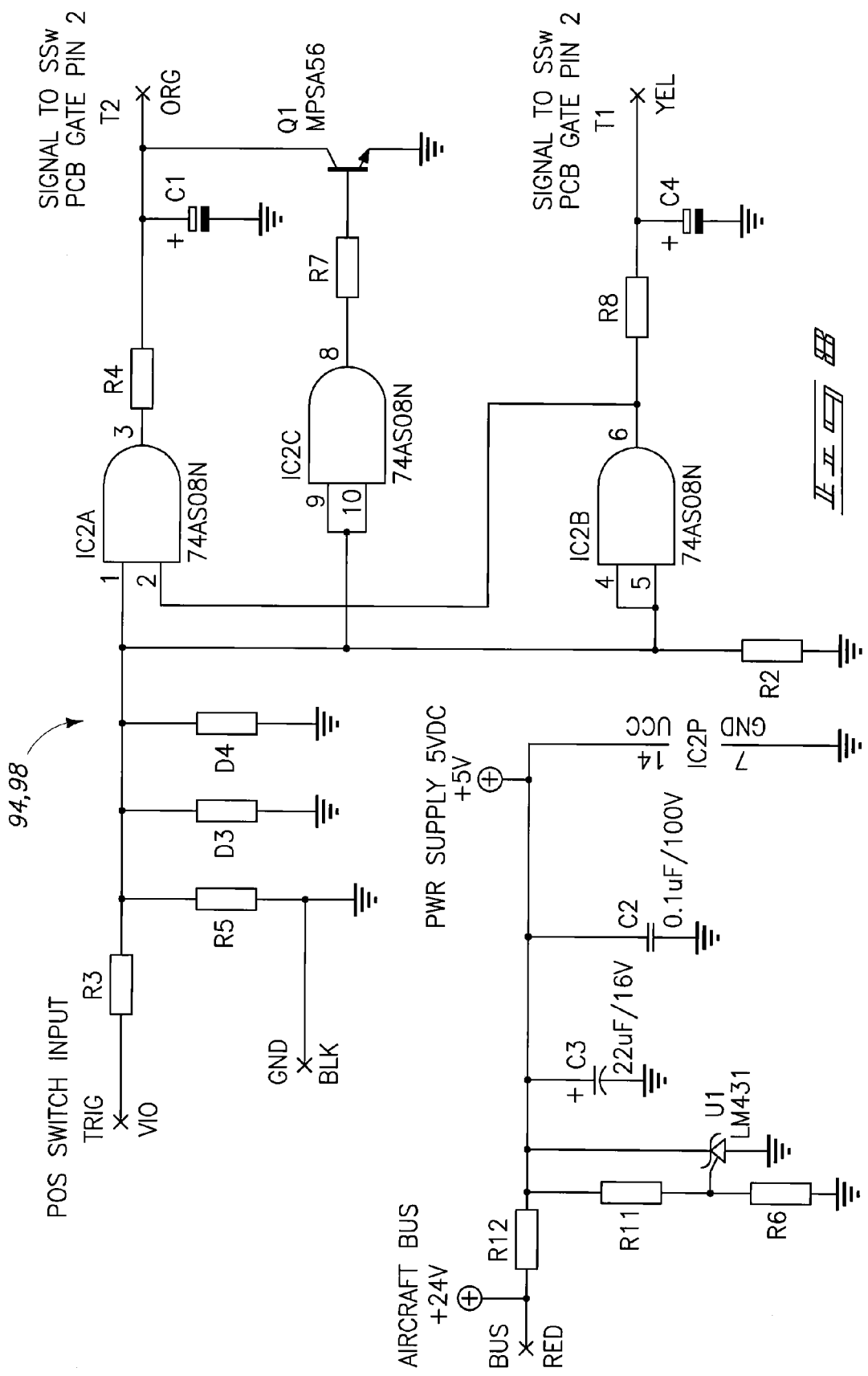

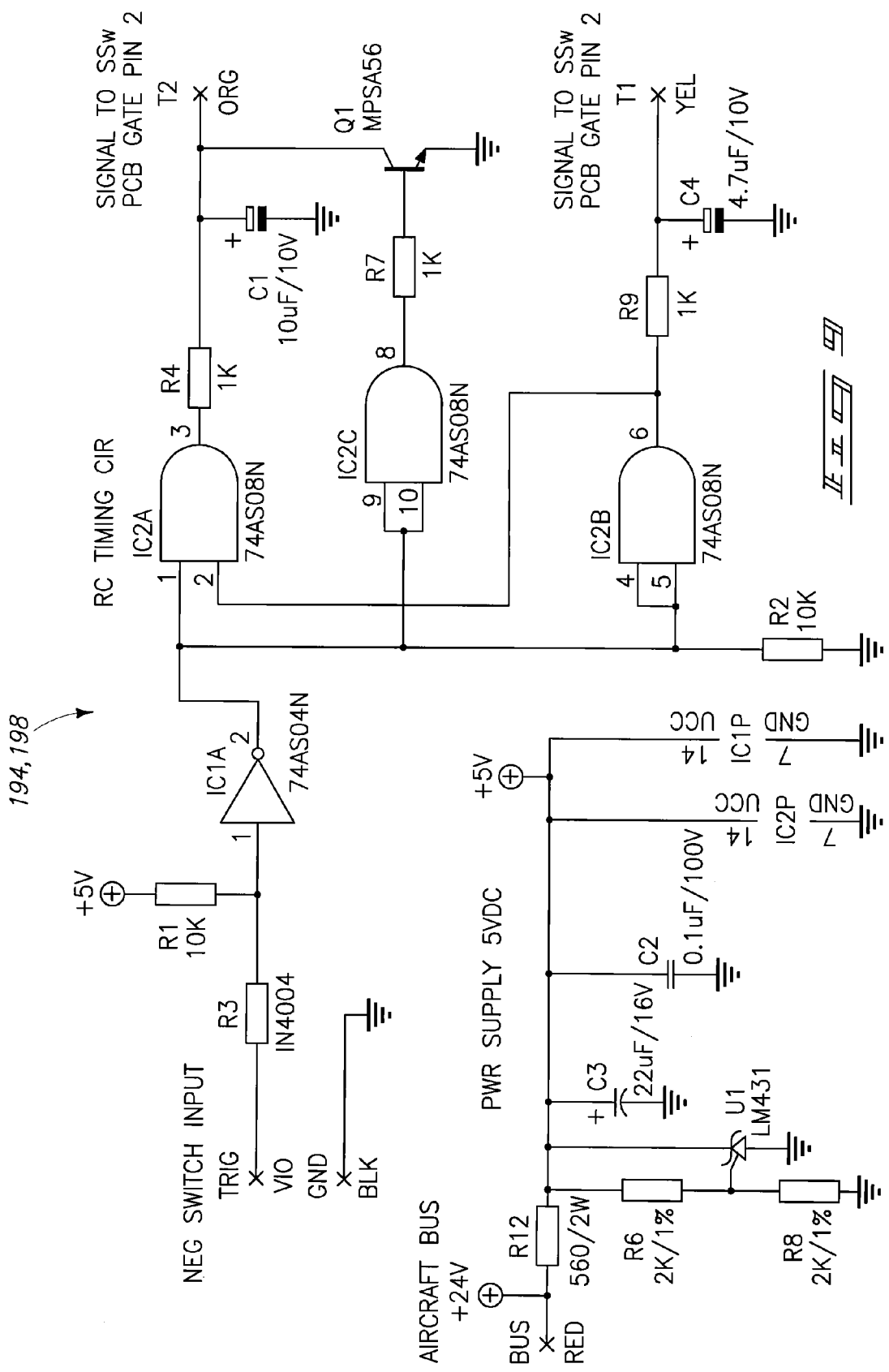

AIRCRAFT POWER SYSTEM AND APPARATUS FOR SUPPLYING POWER TO AN AIRCRAFT ELECTRICAL SYSTEM

TECHNICAL FIELD

The present invention pertains to aircraft power systems. More particularly, the present invention relates to aircraft power systems having solid state unidirectional and bidirectional switches.

BACKGROUND OF THE INVENTION

Aircraft power systems are known to use electromechanical switches, such as contactors, for numerous reasons. It is desirable to maintain substantially uninterrupted power supply to modern aircraft systems during fault conditions and during switching between power supplies, such as when switching between battery, ground power, and/or alternator power. However, electromechanical switches are typically heavy and are generally less reliable than semiconductor switching devices.

As referenced in U.S. Pat. No. 6,091,596, it might be possible to use electronic switching as a partial or complete replacement for electromechanical switches, such as contactors. However, it is acknowledged that such systems have not been developed for typical power supply systems, and electronic switching is furthermore noted as causing problems with heat dissipation in semiconductor switching devices.

FIGS. 4A and 4B illustrate an exemplary prior art power grid, or master control unit, 120 for a small aircraft power system using electromechanical switches in the form of contactors 44-47. Power grid 120 includes an alternator 52, a starter 54, a ground power supply 56, a battery 58, a clock 60, an alternator control unit 62, a charge/discharge meter 64, a starter switch 66, a master switch 68, and a power output connector 70. Contactor 44 is an alternator contactor, contactor 45 is a starter contactor, contactor 46 is a ground power contactor, and contactor 47 is a battery contactor. Hence, four contactors 44-47 are used in this relatively simple power grid 120 which amplifies the negative weight attributes of contactors.

Accordingly, there exists a need to provide electronic switching to reduce overall weight of an aircraft power system while also enhancing heat dissipation of devices used in the aircraft power system.

SUMMARY OF THE INVENTION

Solid state switching devices are provided for switching power in aircraft power systems, particularly for use on small aircraft and experimental aircraft where weight is a concern. The solid state switching devices have reduced weight over contactors and overcome known heat dissipation problems with solid state devices. Accordingly, a relatively light weight aircraft power system results for use in general aircraft. The solid state switch features, both in unidirectional and bidirectional configurations, provides for the supply of necessary power to operate individual functions on an aircraft.

According to one aspect, an aircraft power system is provided having an aircraft power supply and a bidirectional switch. The aircraft power supply includes an alternator, a battery and a load. The bidirectional switch is coupled between one of the alternator and the battery, and the load. The switch includes a first FET, a second FET and timing circuitry. A source of the first FET is coupled with a source of the second FET. A drain of the first FET is coupled with one of the alternator and the battery. A drain of the second FET is coupled with the load. The timing circuitry is configurable to generate a control signal deliverable to a gate of the first FET and the second FET for setting the first FET in selective on and off positions and the second FET in corresponding selective off and on positions.

According to another aspect, an apparatus is provided for supplying power to an aircraft electrical system that includes an aircraft power system and a bidirectional solid state switch. The aircraft power system includes an alternator, a battery and at least one load. The bidirectional solid state switch is coupled with the power supply and includes a first electronic switch, a second electronic switch, and timing circuitry for generating a control signal for setting the first electronic switch in selective on and off positions and the second electronic switch in selective and off and on positions between one of the alternator and the battery, and one of the at least one load.

According to yet another aspect, an aircraft solid state power master control unit is provided including an aircraft power supply, a power management chassis, a grid and a housing. The power management chassis is coupled with the power supply. The grid is mounted to the chassis. The housing is mounted to the grid and is supporting a bidirectional solid state switch coupled with the power supply. The bidirectional solid state switch includes a first electronic switch, a second electronic switch, and timing circuitry for generating a control signal for setting the first electronic switch in selective on and off positions and the second electronic switch in selective off and on positions between one of the alternator and the battery, and one of the at least one load.

BRIEF DESCRIPTION OF THE DRAWINGS

Preferred embodiments of the invention are described below with reference to the following accompanying drawings.

FIG. 3 is a layout for a printed circuit board including a pair of the solid state switches of FIG. 2 and heat dissipation interfaces that couple with an input bus bar and an output bus bar.

FIG. 4 is a diagram illustrating how FIGS. 4A and 4B are to be assembled.

FIGS. 4A and 4B provide an electrical schematic circuit drawing of an aircraft power system using contactors according to a prior art implementation.

FIG. 5 is a diagram illustrating how FIGS. 5A and 5B are to be assembled.

FIGS. 5A and 5B provide an electrical schematic circuit drawing of an aircraft power system using unidirectional and bidirectional switches in accordance with an embodiment of the present invention.

FIG. 8 is a first implementation for the logic circuit gates provided in the aircraft power system of FIGS. 5A and 5B for a positively triggered bilateral solid state switch.

FIG. 9 is a second implementation for the logic circuit gates provided in the aircraft power system of FIGS. 5A and 5B for a negatively triggered bilateral solid state switch.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention comprising a bilateral solid state power switch 72, 78 for an aircraft power system. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

Figure 1:
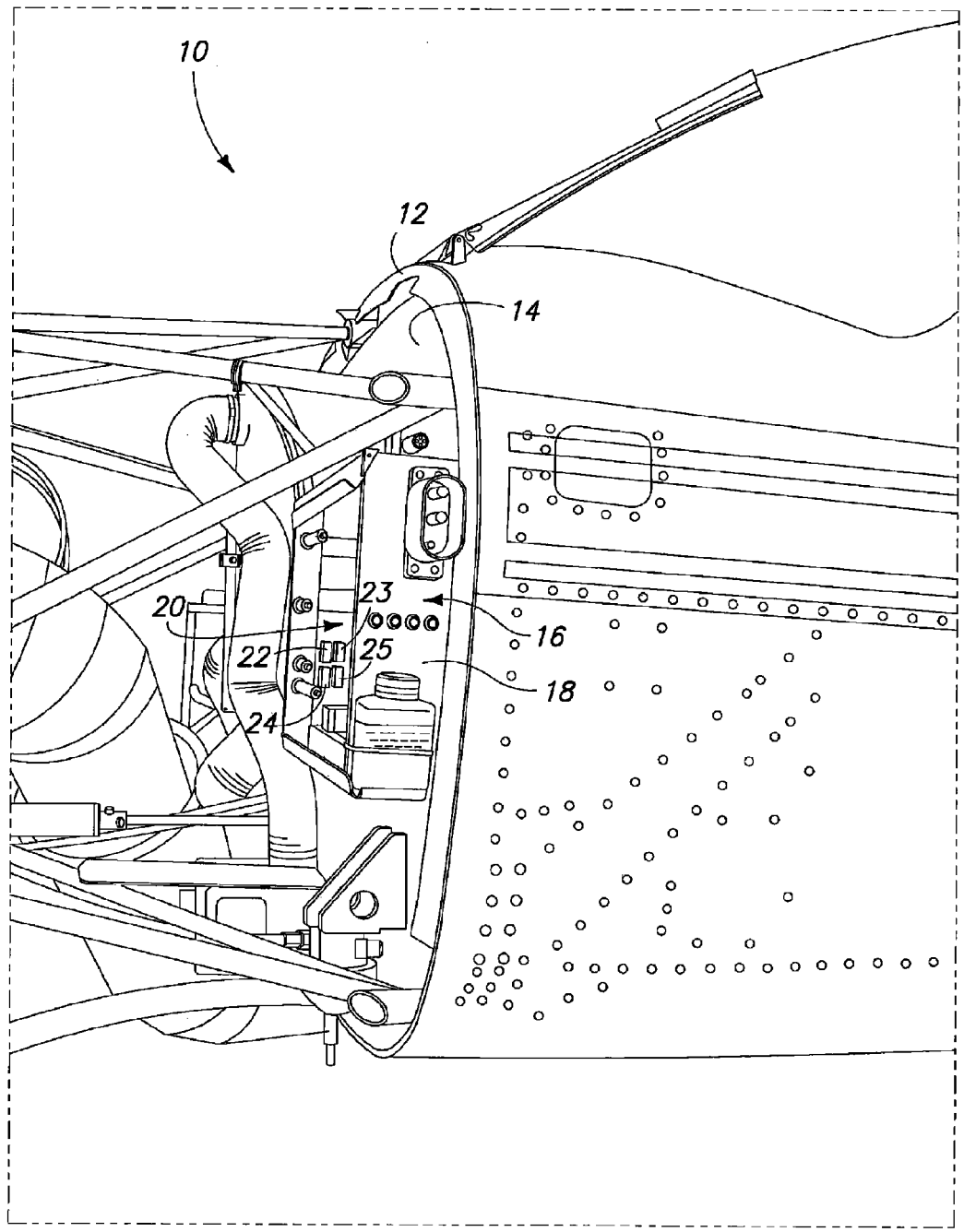
FIG. 1 is a perspective view of an aircraft cowling supporting an aircraft power system having solid state switching devices in accordance with an embodiment of the present invention.

FIG. 1 depicts a portion of a fuselage 12 for a light aircraft 10 that supports an aircraft power system 16 on a cowling 14 of aircraft 10. More particularly, aircraft power system 16 includes a chassis 18 mounted to cowling 14 inside of which a power grid, or master control unit, 20 is supported. Housings 22-25 are mounted within chassis inside of which individual solid state switch devices are contained.

Figure 2:
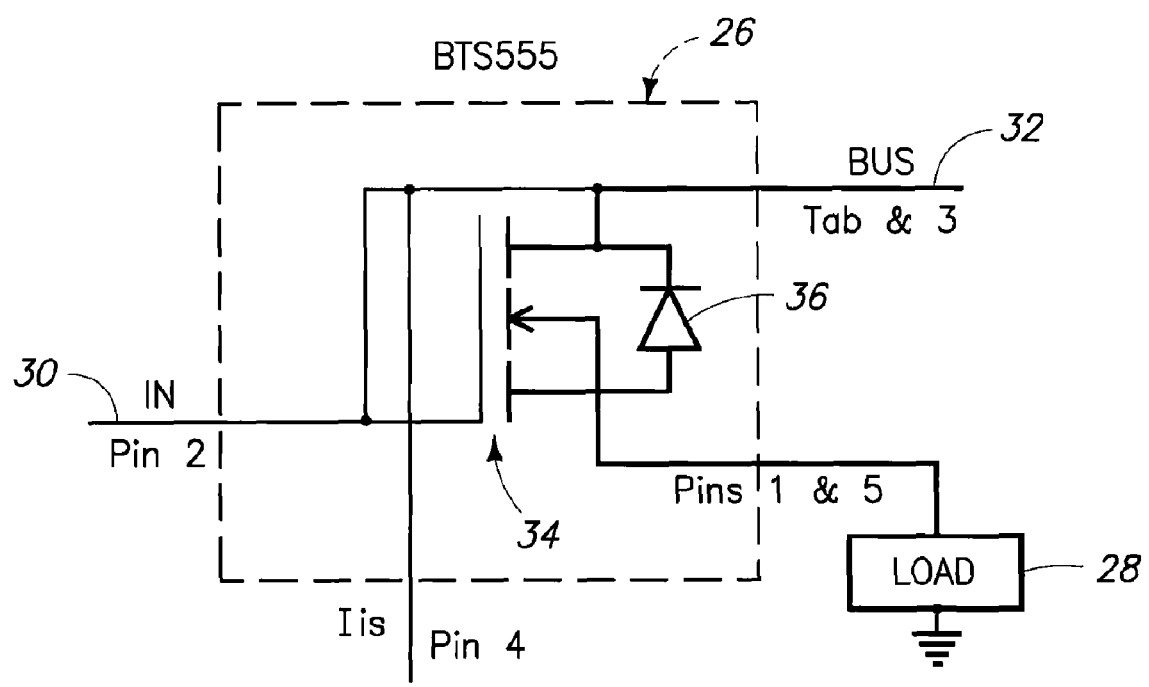
FIG. 2 is an electrical schematic diagram of a unidirectional solid state switch for use in an aircraft power system.

FIG. 2 illustrates a unidirectional solid state switch in the form of a FET switch device 26 that includes an FET 34 and a protection diode 36. An input signal 30 is received from logic circuitry corresponding with a gate of FET 34. A load 28 is coupled with a source of FET 34 while a bus 32 is coupled with a drain of FET 34. When enables by a signal at input 30, current flows through FET 34 from bus 32 to load 28. According to one construction, FET switch device 26 is provided by a smart high side high current power switch, Model No. BTS555, manufactured by Infineon Technologies AG and available in the United States from Infineon Technologies North America Corporation, 640 N. McCarthy Blvd., Milpitas, Calif. 95035. Load 28 can be inductive, capacitive, or resistive.

FET switch device 26 is a smart high-side high current power switch having two FETs provided in parallel to divide current between the two FETs in order to reduce I²R across the junction of the FET on the FET switch device 26.

Figure 3A:
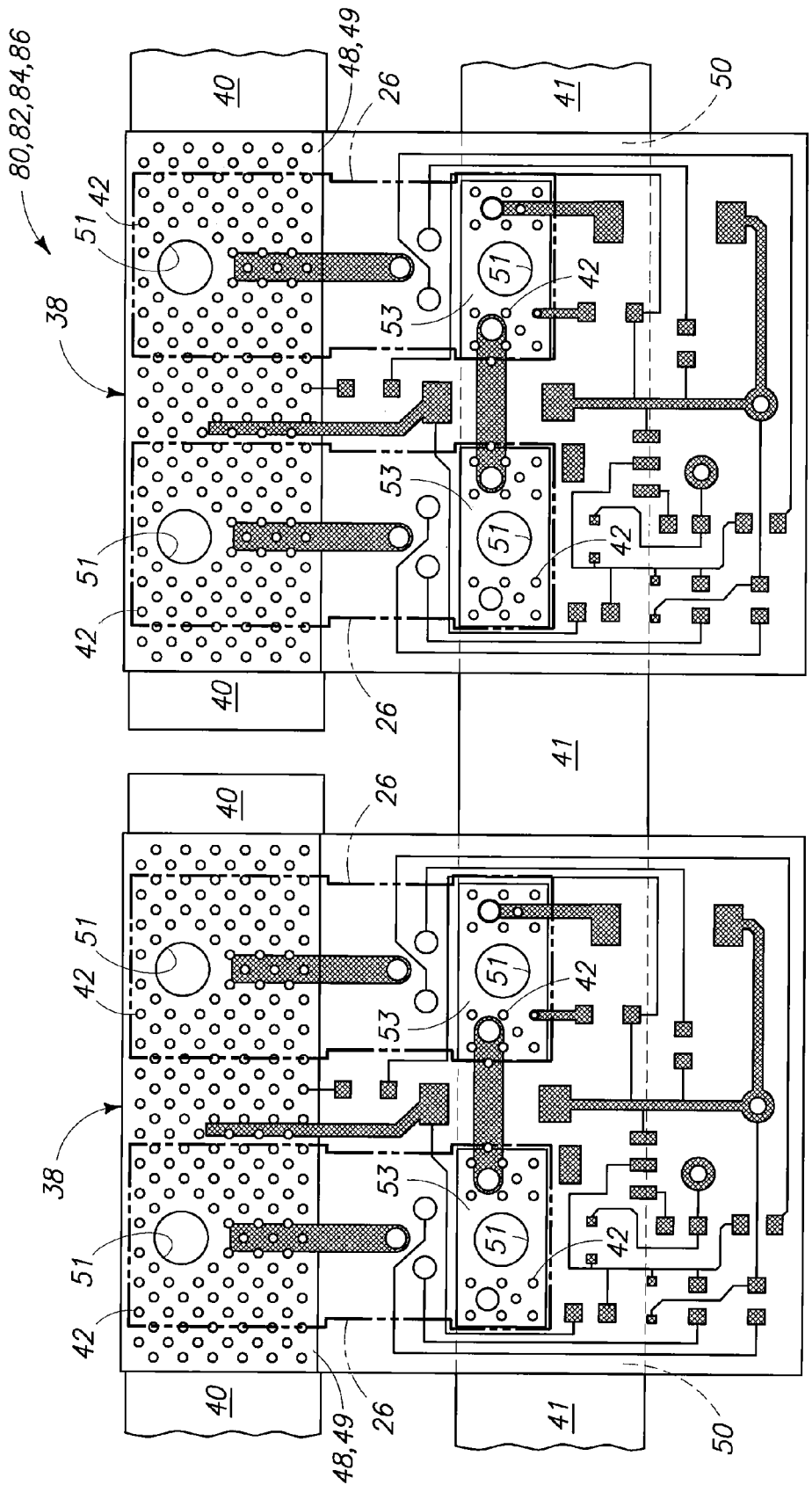
FIG. 3A is a layout for a pair of printed circuit boards, each like the one in FIG. 3, and configured between two input bus bars and an output bus bar to provide a bidirectional switch configuration.

FIG. 3 is a layout for a printed circuit (PC) board 38 that receives a pair of the solid state switches, such as switches 26 of FIG. 2. PC board 38 includes a pair of heat dissipation interfaces that each couple with a respective bus bar 40 and 41. More particularly, PC board 38 includes a pair of opposed top and bottom conductive surfaces 48 and 49 that electrically and thermally interconnect via a plurality of conductive vias 42. Surface 48 engages with an input bus bar in assembly. Another conductive surface 50 is provided along a bottom surface of PC board 38 which electrically and thermally interconnects with an output bus bar 41. Furthermore, top conductive surfaces 53 electrically and thermally communicate with surface 50 via conductive vias 42. A pair of apertures 51 extends through PC board 38 within surfaces 48 and 53, respectively, for mounting FET switch devices 26 using threaded bolts and nuts (not shown). The mounting locations for a pair of FET switch devices 26 are shown on PC board 38, even though the devices are not mounted to PC board 38 in this view. In operation, the conductive lines, conductive surfaces 48-50, vias 42, and bus bars 40, 41 cooperate to dissipate heat generation from the solid state devices on PC board 38; namely, FET switch devices 26. PC board 38 can be configured alone as a unidirectional switch or in pairs as a bidirectional switch (see FIG. 3A, below).

FIG. 3A a layout for a pair of printed circuit (PC) boards 38 that are configured between two input buses 40 and output bus 41 to provide bidirectional switching. Each PC board 38 receives a pair of the solid state switches, such as switches 26 of FIG. 2. Each PC board 38 includes a pair of heat dissipation interfaces that each couple with a respective bus bar 40 and 41. More particularly, each PC board 38 includes a pair of opposed top and bottom conductive surfaces 48 and 49 that electrically and thermally interconnect via a plurality of conductive vias 42. Surface 48 engages with an input bus bar in assembly. Another conductive surface 50 is provided along a bottom surface of PC board 38 which electrically and thermally interconnects with an output bus bar 41. Furthermore, top conductive surfaces 53 electrically and thermally communicate with surface 50 via conductive vias 42. A pair of apertures 51 extends through PC board 38 within surfaces 48 and 53, respectively, for mounting FET switch devices 26 using threaded bolts and nuts (not shown). The mounting locations for a pair of FET switch devices 26 are shown on PC board 38, even though the devices are not mounted to PC board 38 in this view. In operation, the conductive lines, conductive surfaces 48-50, vias 42, and bus bars 40, 41 cooperate to dissipate heat generation from the solid state devices on PC board 38; namely, FET switch devices 26.

Figure 5B:
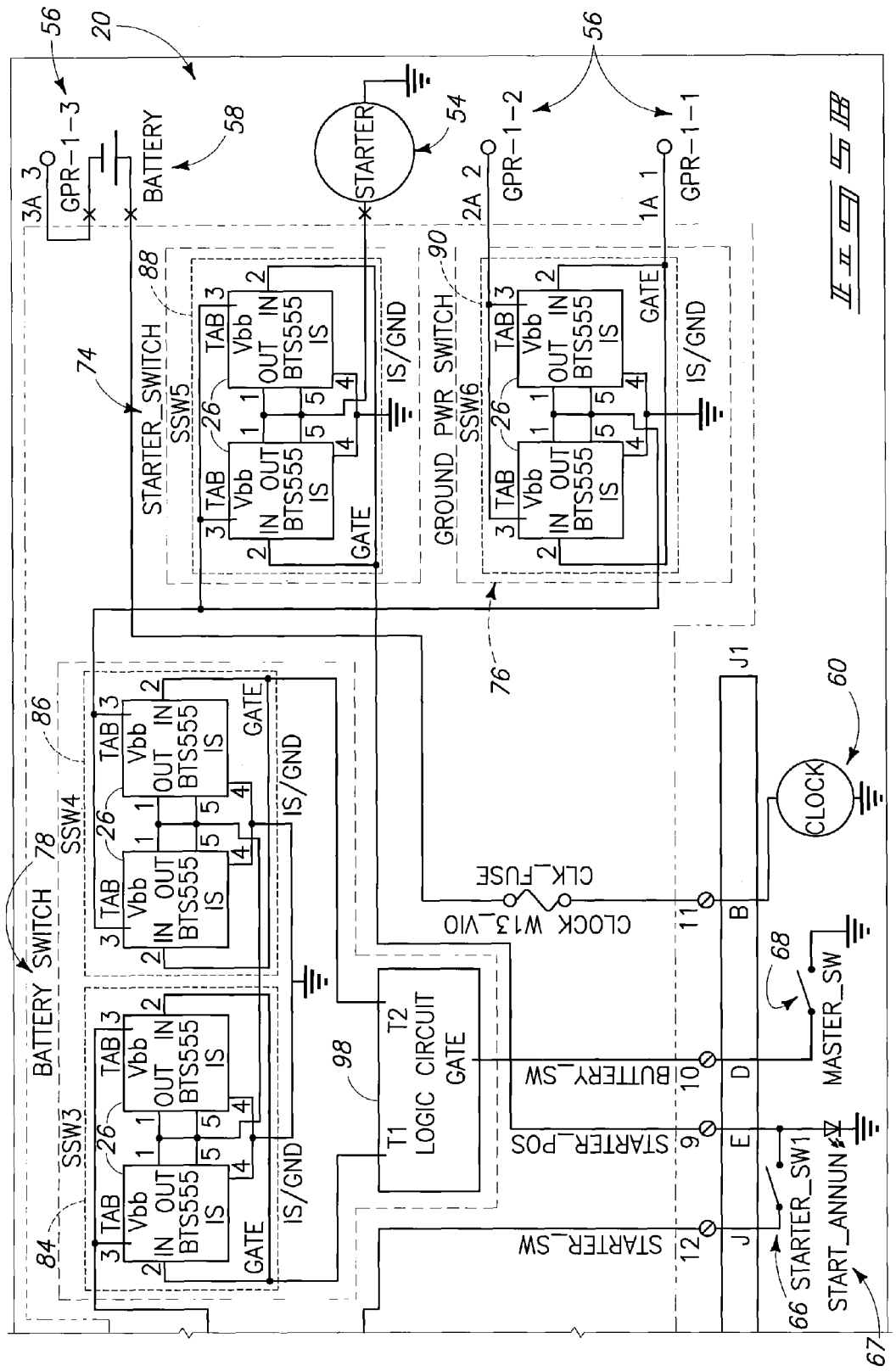

FIGS. 5A and 5B illustrate an exemplary power grid, or master control unit, 20 for a small aircraft power system using solid state switching devices. More particularly, power grid 20 includes a bidirectional alternator switch 72, a unidirectional starter switch 74, a unidirectional ground power switch 76, and a bidirectional battery switch 78. In addition, power grid 20 also includes an alternator 52, a starter 54, a ground power supply 56, a battery 58, a clock 60, an alternator control unit 62, a charge/discharge meter 64, a starter switch 66, a starter annunciator (or operation indicator) 67, a master switch 68, and a power output connector 70. Power grid 20 further includes logic circuit gates 94, 98 and shunt 96.

Alternator switch 72 and battery switch 78 are bidirectional solid state switches that are each formed from a pair of PC boards 38 (see FIG. 3) containing a pair of FET switch devices (see FIG. 2). More particularly, solid state power switches 80, 82 and 84, 86 are configured in opposed pairs within switches 72 and 78, respectively, so that the sources of the respective FETs 34 in each FET switch device 26 on one PC board 80, 84 are tied together with the sources of the respective FETs 34 in each FET switch device on another PC board 82, 86. The pair of FET switch devices 26 within each solid state power switch (PC board) 80, 82, 84 and 86 are connected in parallel in order to divide current between the two devices in order to reduce 12R across the FET within each FET switch device 26.

Starter switch 74 and ground power switch 76 are unidirectional solid state switches that are each formed from a single PC board 38 (see FIG. 3) containing a single FET switch device (see FIG. 2). More particularly, solid state power switches 88 and 90 are provided within switches 74 and 76, respectively. The pair of FET switch devices 26 within each solid state power switch (PC board) 88 and 90 are connected in parallel in order to divide current between the two devices in order to reduce I²R across the FET within each FET switch device 26.

Figure 4A:
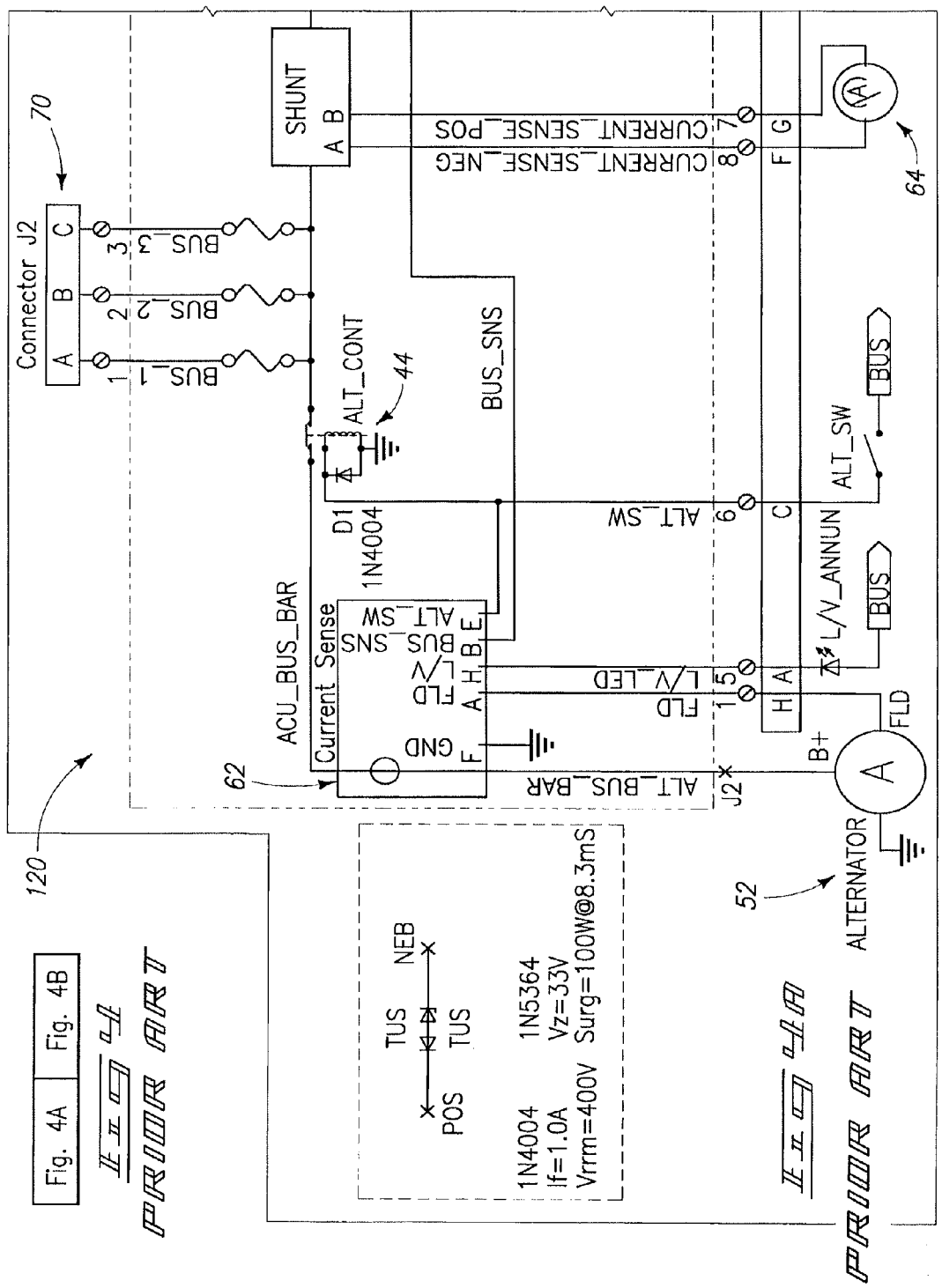

Implementation of aircraft switching with solid state switches provides a significant weight savings, which will be particularly significant for smaller aircraft. For example, the replacement of contactors in the circuit implementation of FIG. 4 with the circuit implementation of FIG. 5 provides a weight savings of 2.08 lbs. This makes the contactor implementation 209.01 percent heavier than the solid state switch implementation.

Figure 6A:
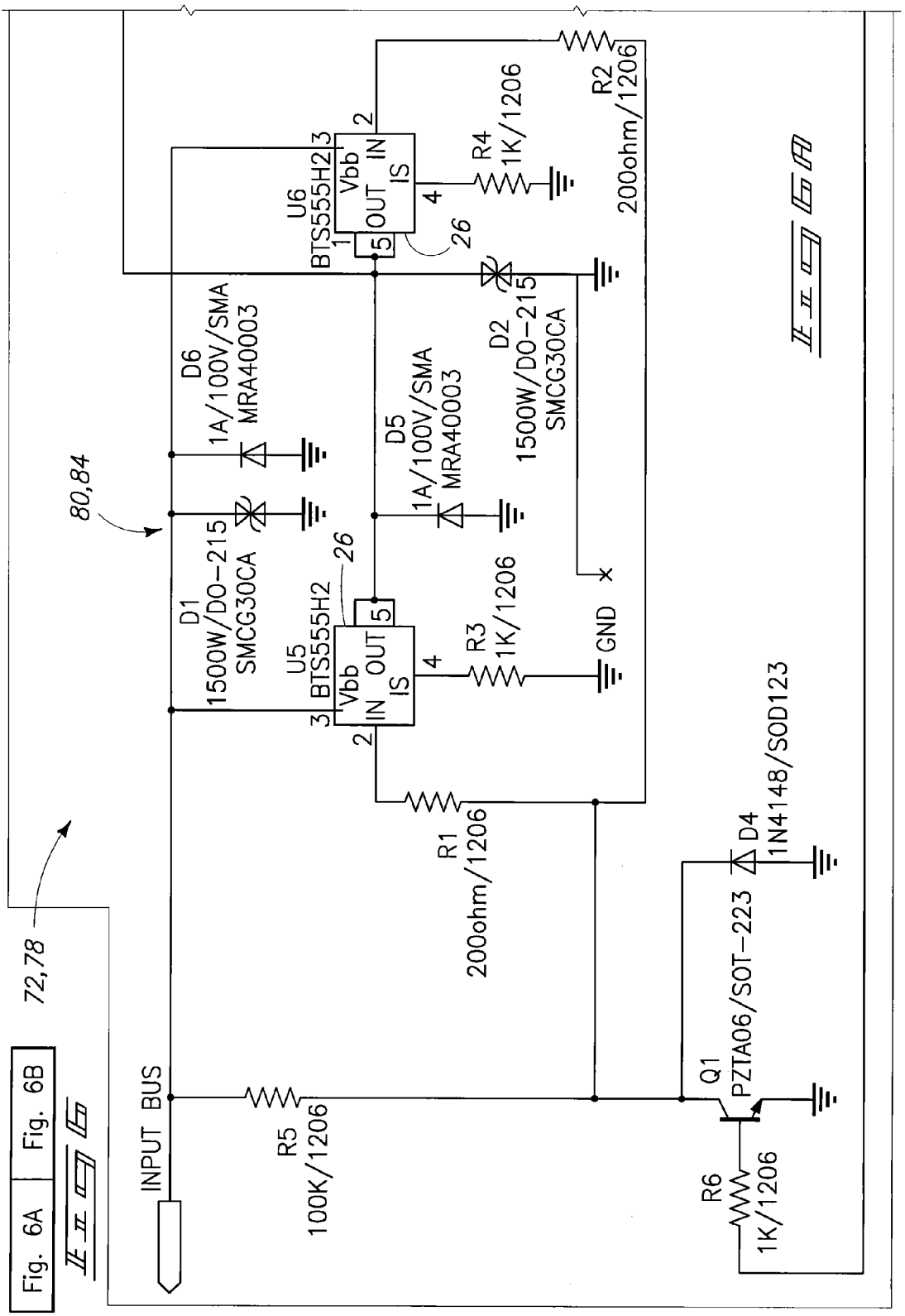
FIG. 6 is an electrical schematic circuit diagram for an exemplary bidirectional switch that uses a pair of back-to-back solid state power switches to provide the alternator switch and battery switch of FIGS. 5A and 5B.
Figure 6B:
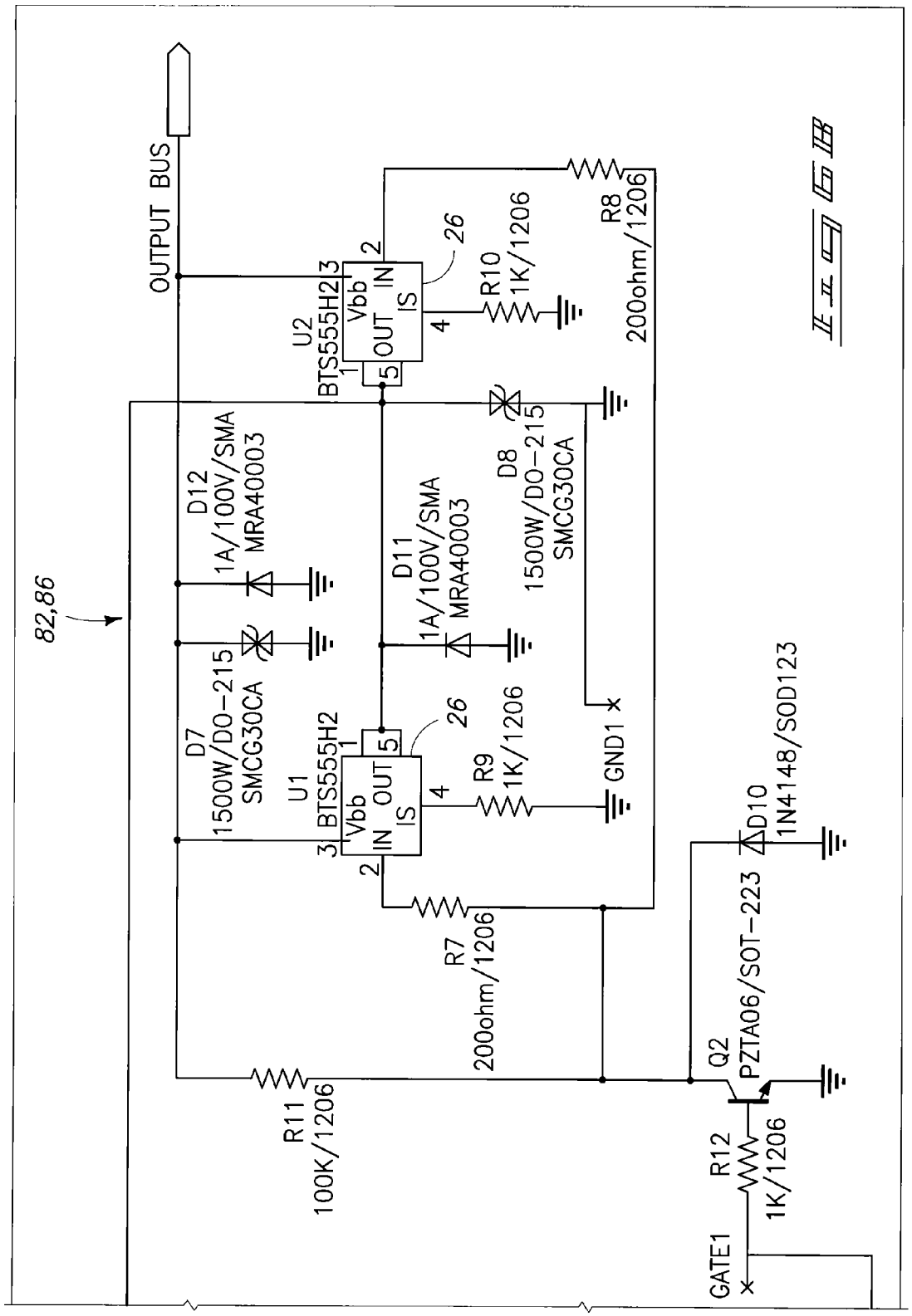

FIGS. 6A and 6B illustrate an electrical schematic circuit diagram for an exemplary bidirectional switch that uses a pair of back-to-back solid state power switches to provide the alternator switch 72 and battery switch 78 of FIGS. 5A and 5B. More particularly, alternator switch 72 includes solid state power switches 80 and 82, each provided on a dedicated PC board 38 (see FIG. 3) and each including a pair of FET switch devices 26 provided in parallel on each board, with the FET switch devices 26 on the two boards placed in opposed relation in series with the outputs tied together. Likewise, battery switch 78 includes solid state power switches 84 and 86, each provided on a dedicated PC board 38 (see FIG. 3) and each including a pair of FET switch devices 26 provided in parallel on each board, with the FET switch devices 26 on the two boards placed in opposed relation in series with the outputs tied together. Associated protection diodes, resistors and semiconductor devices are shown in FIGS. 6A and 6B by way of one exemplary implementation.

Switches 72 and 78 are bidirectional switches that correspond with the devices of FIG. 3A (and include components from FIGS. 2 and 3). More particularly, switches 72 and 78 each provide a Bidirectional Solid State Switch (SSw_BiDir). In a number of applications, the switch may be required to pass current in both directions, as well as the ability to cut-off current flow from either direction (same application as a contactor). The bidirectional switch was designed to do just that. The bidirectional switch includes two unidirectional switches provided in series to each other with the outputs (sources of the FET) tied together. Accordingly, current will be flowing in reverse in one of the switches (source to drain), as shown in the bidirectional switch schematic of FIG. 6. Both switches 80 and 84 must be turned "ON" or "OFF", in a sequence so that the load current will NOT flow through the diode which is now forward biased, shown in FIG. 2. A logic circuit is designed to turn "ON" and "OFF" the appropriate switch 80 and 84 and in the correct order, thereby protecting the respective switch from damage.

Thermal run-a-way occurs when current flows in reverse through the device when "OFF" due to the protection diode in the forward position shown in FIG. 2. However, this will not happen when the device is "ON" due to the FET being on. The resistance of the FET junction is much less than the Diode junction allowing the major current to flow through the FET of the device.

Figure 7:
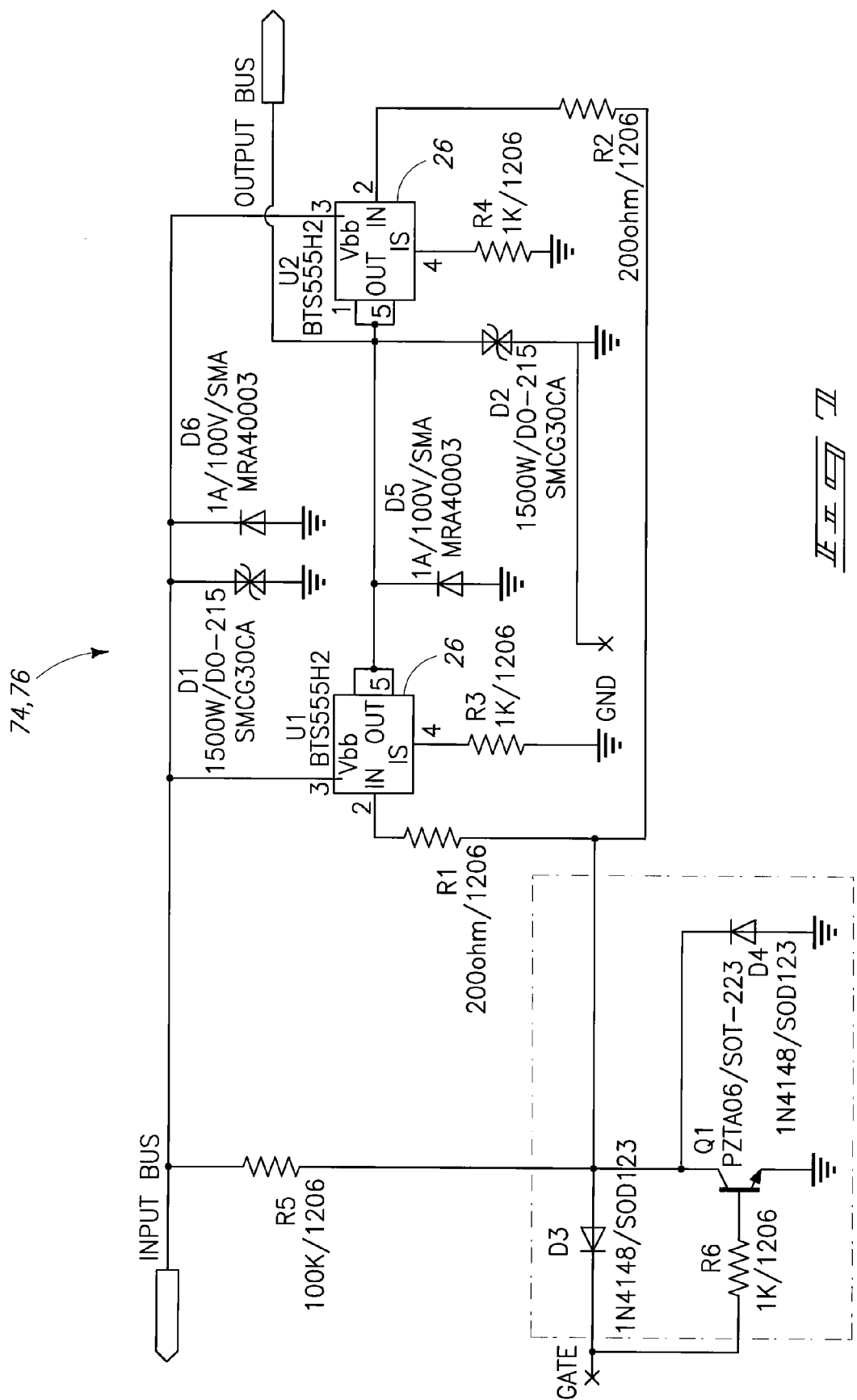
FIG. 7 is an electrical schematic circuit diagram for an exemplary unidirectional switch that uses a solid state power switch to provide the starter switch and the ground power switch of FIGS. 5A and 5B.

FIG. 7 illustrates an electrical schematic circuit diagram for an exemplary unidirectional switch that uses a solid state power switch to provide the starter switch 74 and the ground power switch 76 of FIGS. 5A and 5B. More particularly, starter switch 74 includes solid state switch 88 provided on a dedicated PC board 38 (see FIG. 3). PC board 38 of switch 74 includes a pair of FET switch devices 26 provided in parallel on the PC board. Likewise, ground power switch 76 includes solid state switch 90 provided on a dedicated PC board 38 (see FIG. 3). PC board 38 of switch 76 includes a pair of FET switch devices 26 provided in parallel on the PC board. Associated protection diodes, resistors and semiconductor devices are shown in FIG. 7 by way of one exemplary implementation. For Low Side (Neg) switching input D3 will be used, Q1, R6, D4 will not be used. For High Side (Pos) switching Q1, R6, D4 will be used, D3 will not be used.

Switches 74 and 76 are unidirectional switches that correspond with the devices depicted in FIGS. 2 and 3. More particularly, switches 74 and 76 each provide a unidirectional solid state switch (SSw_UiDir). The switch's design is centered around a Smart High-Side High Current Power Switch. The switch is designed with two devices in parallel dividing the current between the two devices, which reduces the I²R across the junction of the FET of the device, shown in FIG. 2 and FIG. 7. The PC board is designed to allow for the dissipation of heat from the device through the PC board and out through the bus bars, shown in FIG. 3. The unidirectional switch is designed to pass current in one directional only, from the drain to the source of the FET.

The unidirectional switch is turned "ON" by applying a path to ground (GND) at Pin 2. The $I_{is}$ Pin 4 is connected to ground through a nominal resistor for current feedback. The tab and Pin 3 are connected together at the drain of the FET. The tab is used to channel the heat of the device at high current applications to the bus bar of the lay-out, shown in the assembly drawing of the unidirectional switch. Pins 1 and 5 are tied together at the source of the FET which is the output of the device. The lay-out was designed is such away to allow the switch to directly replace a contactor, and the design is unique in that the PC board assembly will control the switch while passing current through the FET and displacing the heat through the attached bus bars.

FIG. 8 illustrates a first implementation for the logic circuit gates 94, 98 (see FIGS. 5A and 5B) provided in the aircraft power system of FIGS. 5A and 5B for a positively triggered bilateral solid state switch, such as alternator switch 72 and battery switch 78 (see FIGS. 5A and 5B). Associated protection diodes, resistors and semiconductor devices are shown in FIG. 7 by way of one exemplary implementation. The circuit allows for the correct semiconductor switch (80, 82 and 84, 86 within switches 72 and 78, respectively) to be turned on/off within the bilateral switch unit dependent on the direction of current flow through the semiconductor switch. Recall that two unilateral PC boards make up a bilateral switch (see FIG. 3A and FIGS. 6A and 6B), with two BTS555 devices provided on each PC board (printed circuit board).

FIG. 9 illustrates a second implementation for logic circuit gates 194, 198 that can be substituted for gates 94, 98 (see FIG. 8) and provided in the aircraft power system of FIGS. 5A and 5B for a negatively triggered bilateral solid state switch, such as alternator switch 72 and battery switch 78 (see FIGS. 5A and 5B). Associated protection diodes, resistors and semiconductor devices are shown in FIG. 7 by way of one exemplary implementation. The circuit allows for the correct semiconductor switch (80, 82 and 84, 86 within switches 72 and 78, respectively) to be turned on/off within the bilateral switch unit dependent on the direction of current flow through the semiconductor switch. Recall that two unilateral PC boards make up a bilateral switch (see FIG. 3A and FIGS. 6A and 6B), with two BTS555 devices provided on each PC board (printed circuit board).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An aircraft power system, comprising:
   an aircraft power supply including an alternator, a battery and a load; and
   a bidirectional switch coupled between one of the alternator and the battery, and the load, the switch including a first FET, a second FET and timing circuitry, a source of the first FET coupled with a source of the second FET, a drain of the first FET coupled with one of the alternator and the battery, and a drain of the second FET coupled with the load, and the timing circuitry configurable to generate at least one control signal deliverable to a gate of the first FET and the second FET for setting the first FET in selective on and off positions and the second FET in corresponding selective off and on positions.

2. The aircraft power system of claim 1, wherein the bidirectional switch comprises a bidirectional alternator switch coupled between the alternator and the load.

3. The aircraft power system of claim 1, wherein the bidirectional switch comprises a bidirectional battery switch coupled between the battery and the load.

4. The aircraft power system of claim 1, wherein the switch further comprises a third FET connected in parallel with the first FET and a fourth FET connected in parallel with the second FET.

5. The aircraft power system of claim 4, wherein the first FET and the third FET, and the second FET and the fourth FET each cooperate in parallel to divide current therebetween to reduce power across a junction of the respective FETs.

6. The aircraft power system of claim 5, wherein the first FET and the third FET are electrically coupled in series with the second FET and the fourth FET, and the sources (outputs) of the first FET and the third FET are electrically coupled with the sources (outputs) of the second FET and the fourth FET.

7. The aircraft power system of claim 1, further comprising a forward biased diode provided between the source and the drain of the first FET and the second FET.

8. An apparatus for supplying power to an aircraft electrical system, comprising:
   an aircraft power supply system including an alternator, a battery and at least one load; and
   a bidirectional solid state switch coupled with the power supply system including a first electronic switch, a second electronic switch, and timing circuitry for generating at least one control signal for setting the first electronic switch in selective on and off positions and the second electronic switch in selective off and on positions between one of the alternator and the battery, and one of the at least one load;
   wherein the first electronic switch and the second electronic switch each comprise at least one FET;
   wherein a source of one FET is connected with a source of another FET, and wherein a drain of the one FET is connected with a first load and a drain of the another FET is connected with a second load.

9. The apparatus of claim 8, wherein the switch is an aircraft alternator switch, the first load is an alternator, and the second load is a load side of an aircraft power grid.

10. The apparatus of claim 8, wherein the switch is an aircraft battery switch, the first load is a battery and the second load is a load side of an aircraft power grid.

11. An aircraft solid state power master control unit, comprising:
    an aircraft power supply having an alternator, a battery and at least one load;
    a power management chassis coupled with the power supply;
    a grid mounted to the chassis; and
    a housing mounted to the grid and supporting a bidirectional solid state switch coupled with the power supply including a first electronic switch, a second electronic switch, and timing circuitry for generating at least one control signal for setting the first electronic switch in selective on and off positions and the second electronic switch in selective off and on positions between one of the alternator and the battery, and one of the at least one load;
    wherein the first electronic switch and the second electronic switch each comprise at least one FET, wherein a source of one FET is connected with a source of another FET, and wherein a drain of the one FET is connected with first load and a drain of the another FET is connected with a second load.

12. The aircraft solid state power master control unit of claim 11, further comprising a first printed circuit board supporting the first electronic switch and a second printed circuit board supporting the second electronic switch, the first printed circuit board and the second printed circuit board supported within the housing.

* * * * *